United States Patent
Chen et al.

(10) Patent No.: US 9,153,126 B2
(45) Date of Patent: Oct. 6, 2015

(54) SMART SWITCH AND REMOTE CONTROL SYSTEM USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Te-Sheng Chen, New Taipei (TW); Xiao-Guang Li, Shenzhen (CN); Kuan-Hong Hsieh, New Taipei (TW); Yun Xiao, Shenzhen (CN); Shang-Hui Pi, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 36 days.

(21) Appl. No.: 14/014,332

(22) Filed: Aug. 29, 2013

(65) Prior Publication Data

US 2014/0064737 A1    Mar. 6, 2014

(30) Foreign Application Priority Data

Aug. 31, 2012   (CN) .......................... 2012 1 03179758

(51) Int. Cl.
*H04B 10/40* (2013.01)
*H04B 10/50* (2013.01)
*H04B 10/60* (2013.01)
*G08C 23/04* (2006.01)
*G08C 17/02* (2006.01)

(52) U.S. Cl.
CPC ................ *G08C 23/04* (2013.01); *G08C 17/02* (2013.01); *H04B 2203/00* (2013.01); *H04Q 2209/88* (2013.01)

(58) Field of Classification Search
CPC .......... H04B 3/54; H04B 3/542; H04B 3/544; H04B 3/546; H04B 3/548; H04B 3/56; H04B 2203/00; H04B 2203/5404; H04B 2203/5429; H04B 2203/5433; H04B 2203/5445; H04B 2203/5462; H04Q 9/00; H04Q 2209/00; H04Q 2209/20; H04Q 2209/25; H04Q 2209/30; H04Q 2209/40; H04Q 2209/88; H04Q 2209/883
See application file for complete search history.

(56) References Cited

U.S. PATENT DOCUMENTS 5,724,168 A * 3/1998 Oschmann et al. ........... 398/127
2007/0008302 A1 * 1/2007 Uchida et al. ................. 345/173

FOREIGN PATENT DOCUMENTS

CN          2981141 Y        4/2007

* cited by examiner

*Primary Examiner* — Darren E Wolf
(74) *Attorney, Agent, or Firm* — Novak Druce Connolly Bove + Quigg LLP

(57) ABSTRACT

A smart switch applied to a remote control system in a smart home is connected to a power and at least one electronic device. The smart switch includes a storage, and a communication unit receiving commands from a remote source which include the unique identification code of a target electronic device. A smart gateway, a remote unit, and a processor unit including a converting module and a control module are also included. The converting module converts the remote command to a control signal that can be recognized by the electronic device, and the control module controls the remote unit to send the control signal to the electronic device. A remote control system is also provided.

10 Claims, 4 Drawing Sheets

SMART SWITCH AND REMOTE CONTROL SYSTEM USING THE SAME

BACKGROUND

1. Technical Field

The present disclosure relates to smart home technology, and particularly to a smart switch and a smart remote control system employing the smart switch.

2. Description of Related Art

A manual switch may be arranged on a wall or floor of the house for turning on/off the power of electronic devices. Some switches also include sockets and indicator lights configured to indicate power states. However, these functions of the manual switch are the only functions.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean "at least one."

Figure 1:
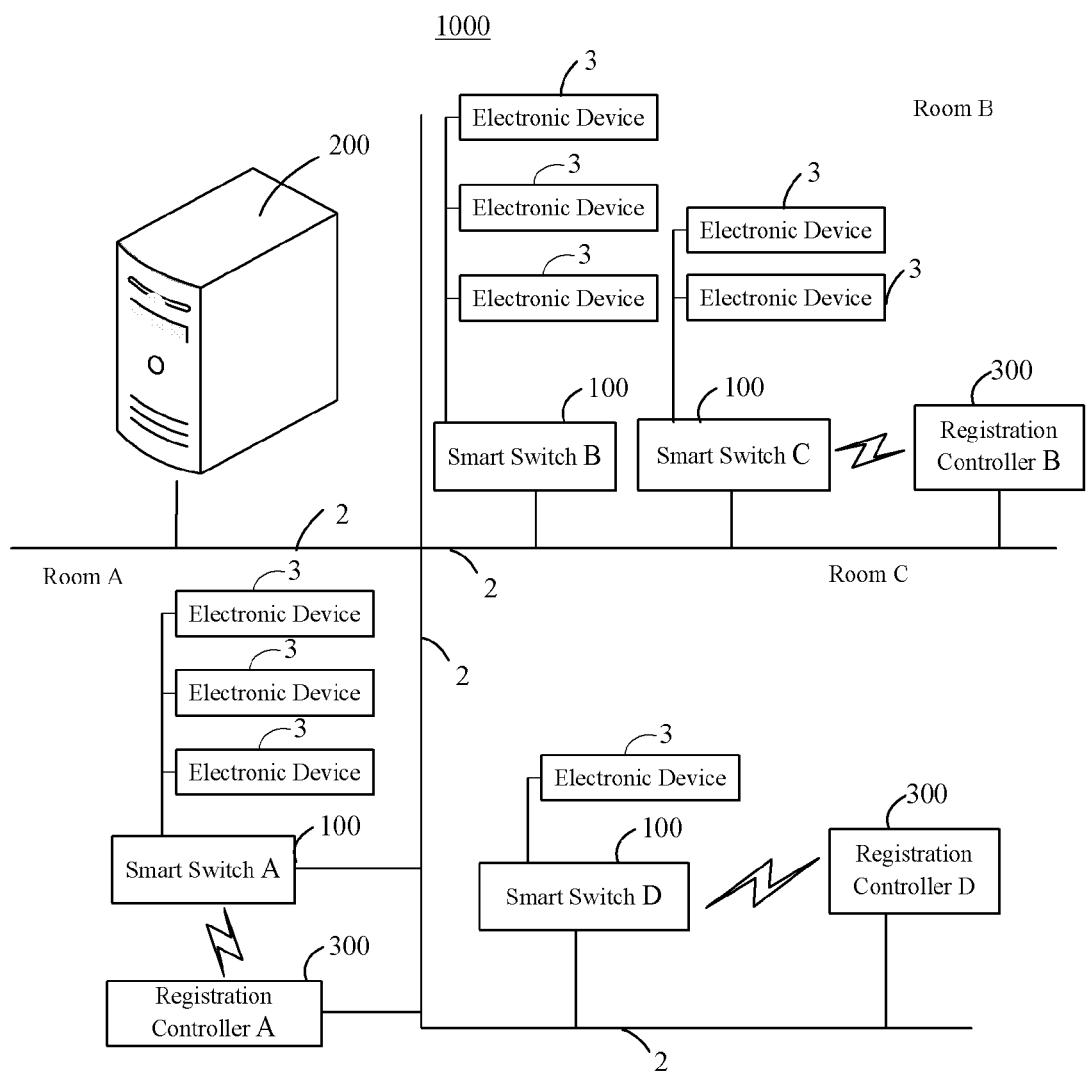
FIG. 1 is a schematic view showing a smart remote control system, according to a first exemplary embodiment.
Figure 2:
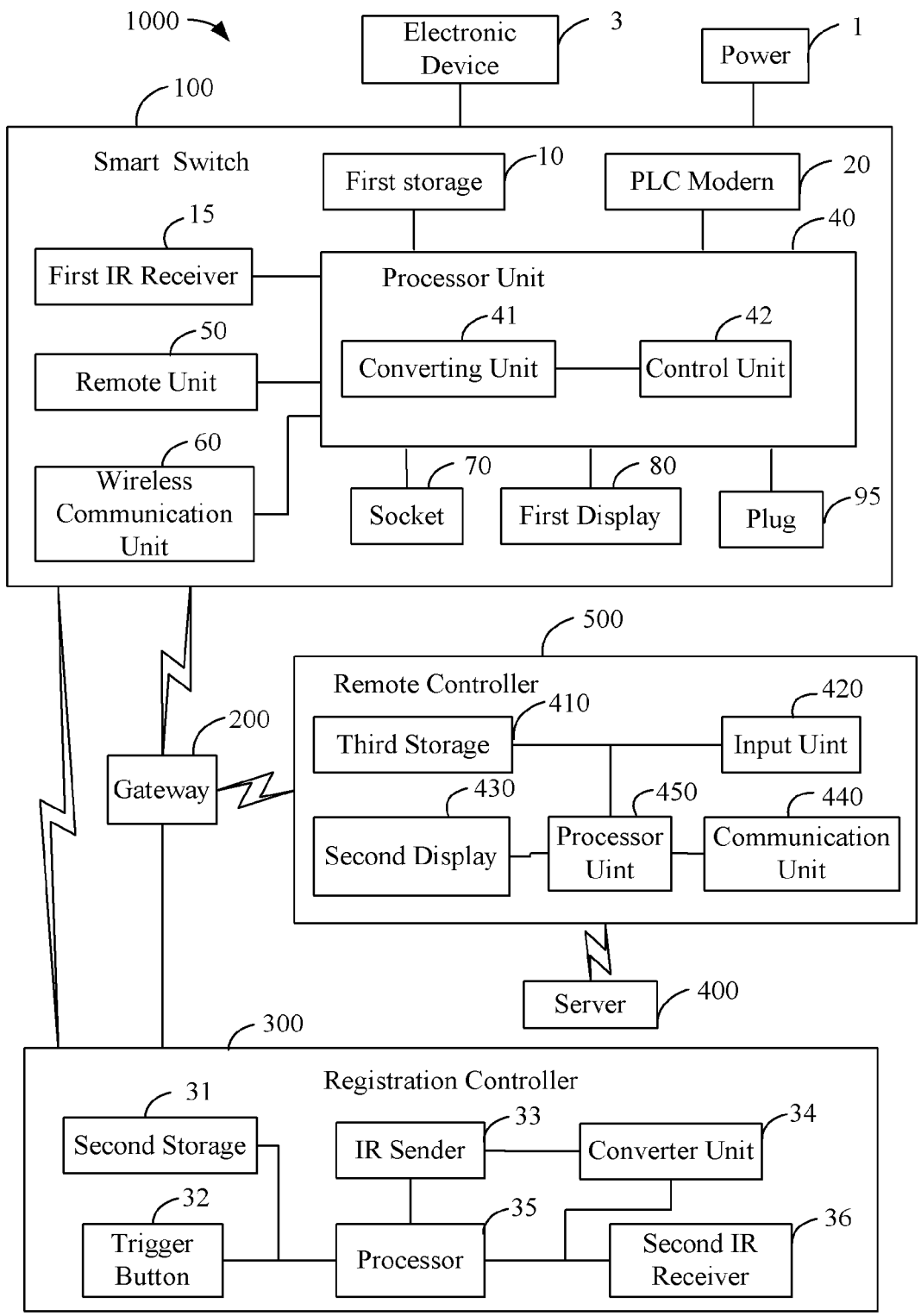
FIG. 2 is a block diagram of the smart remote control system of the FIG. 1.

Referring to FIGS. 1 and 2, a smart remote control system 1000 in accordance with a first embodiment is provided. FIG. 2 is a block diagram of the smart remote control system 1000. The smart remote control system 1000 includes a plurality of smart switches 100, a gateway 200 connected to the smart switches 100 in a wired or wireless manner, such as power line 2 (or optical fiber power line), a plurality of registration controllers 300 connected to the gateway 200 in a wired or wireless manner, a number of electronic devices 3 plugged into the smart switches 100, a server 400 connected to the gateway 200 and a remote controller 500 communicating with the server 400 and the gateway 200. The electronic devices 3 can be home appliances. The registration controllers 300 are arranged in every room of a house employing the smart remote control system 100. The smart switch 100 is connected to the gateway 200 in a wired or wireless manner, the wired mode can be Power Line Communication (hereinafter PLC), Optical Fiber Power Line Communication (hereinafter OPLC), wired internet communication, coaxial cable communication, telephone line communication, or other communication technologies.

Referring to FIGS. 1 and 2 again, the smart switch 100 includes a first infrared (IR) receiver 15 configured to receive IR signals sent by the registration controller 300.

User can use the registration controller 300 to control the smart switches 100 in a room in which the registration controller 300 is located, to automatically register on the gateway 200. In detail, the smart switch 100 sends a unique identification code (UID) to the gateway 200, to register on the gateway 200. In the first embodiment, the smart switch 100 includes a number of sockets, each of the sockets is assigned a UID, the smart switch 100 further sends the UIDs of the sockets to the gateway 200, thereby the sockets being registered on the gateway 200. Each of the registration controllers 300 also includes a stored UID.

A registration process of how the smart switches 100 register on the gateway 200 is explained.

Referring to FIG. 1, the gateway 200, a number of the smart switches 100 and the registration controllers 300 are connected to the power line 2 (or optical fiber power line), and capable of communicating with each other via PLC (or OPLC). In this embodiment, the smart switches 100 include a smart switch A 100, a smart switch B 100, a smart switch C 100 and a smart switch D 100. The registration controllers 300 include a registration controller A 300, a registration controller B 300 and a registration controller D 300. The smart switch A 100 and the registration controller A 300 are located in a room A, the smart switch B 100, the smart switch C 100 and the registration controller B 300 are located in a room B, the smart switch D 100 and the registration controller D 300 are located in a room C. The gateway 200 can automatically communicate with all devices connected on the power line 2 (or optical fiber power line) via PLC (or OPLC).

Referring to FIG. 2, each registration controller 300 includes a third storage 31, a trigger button 32, an IR sender 33, a converter unit 34, a processor 35 and a second IR receiver 36. The registration controller 300 needs to be connected to the gateway 200, before the smart switches 100 can be registered on the gateway 200. To connect the registration controller 300, the registration controller 300 is located within the communicating range of the gateway 200, and a connection program is run on the smart gateway 20. Then, the smart gateway 200 establishes communication with the registration controller 300, and sends its UID and a secret code to the registration controller 300 wirelessly. The registration controller 300 receives and saves the UID of the gateway 200 and the secret code into the third storage 31. The registration controller 300 further sends its UID to the gateway 200 wirelessly, the gateway 200 receives and saves the UID of the registration controller 300, to finish the connecting process. In this embodiment, the registration controller 300 receives the UID of the gateway 200 and the secret code via the second IR receiver 36, and sends the UID of the registration controller 300 to the gateway 200 via the IR sender 33. In this embodiment, the secret code is the UID of the gateway 200 or a code input by the user. The secret code is configured to encode or decode the data transmitted between the gateway 200 and the registration controller 300, thus preventing unauthorized user access. In other embodiments, the gateway 200 and the registration controller 300 can communicate via BLUETOOTH, Z-WAVE NFC, ZIGBEE, WIFI, or other communication technologies.

If user wants to register the smart switches 100 on the gateway 200, user must locate the registration controller 300 in the room which has the smart switches 100 needing to be registered, and run a registering program on the smart gateway 200.

For example, the registration controller B 300 shown in FIG. 1 is located in the room B, the smart switches B and C 100 are also located in the room B. The trigger button 32 generates a trigger signal in response to a pressing by user, and sends the trigger signal to the processor 35. The processor 35 controls the IR sender 33 to send a registration request to the gateway 200, and sends an IR signal in response to the trigger signal. The smart switches 100 arranged in the room B can receive the IR signal. In this embodiment, the registration controller B 300 sends the registration request to the gateway 200 via the power line 2 in response to the trigger signal. The IR signal includes the UID of the registration controller B 300, the UID of the gateway 200, and the secret code sent by the gateway 200. The smart switches B and C 100 stores the UID of the registration controller B 300 and the secret code contained in the IR signal into the first storage 10. The registration request includes the UID of the registration controller B 300 and UID of the gateway 200.

The gateway 200 broadcasts signal to all of the smart switches 100 connected on the power line for determining whether the smart switch 100 has received the IR signal sent by the registration controller 300, in response to the received registration request. The smart switches 100 which receive the IR signal send an encoded registration code to the gateway 200, in response to the broadcast signal. In this embodiment, the smart switches 100 are registered on the gateway 200 in a driven registration manner.

In this example, the smart switches B and C 100 located in room B send an encoded registration code to the gateway 200, in response to the broadcast signal. The smart switches B and C 100 can send the encoded registration code to the gateway 200 via the power line 2. The registration code includes the UID of the smart switch 100 and the UID of the registration controller 300 stored in the first storage 10. If the smart switch 100 includes more than one socket, the registration code further includes the UID of each socket.

The gateway 200 decodes the registration code and determines whether or not the UID of the registration controller 300 contained in the registration code matches the UID of the registration controller 300 contained in the registration request; if yes, the gateway 200 stores the UID of the smart switch 100. In this way, the smart switch 100 is registered on the gateway 200, the gateway 200 can send control signals including the UID of the target smart switch 100, and all the smart switches 100 determine whether the UID of the received control signal matches with their own UID. Only the matching smart switch 100 can parse the control signals, thus creating a point-to-point communication between the gateway 200 and the smart switch 100.

In an embodiment, the converter unit 34 of the registration controller 300 is configured to receive the control signals from the power line 2 sent by the gateway 200, and convert the control signals. The IR sender 33 sends the converted control signals to the corresponding smart switch 100 to control the electronic device 3 connected on the smart switch 100.

In an embodiment, the smart switch 100 which receives the IR signal sends an encoded registration code to the gateway 200 directly. In this way, the smart switches 100 can be registered on the gateway 200 in a forward registration manner, instead of the driven registration manner mentioned before. The other registration processes in the forward registration manner are the same as those of the driven registration manner, they are not repeated here.

All the signals transmitted between the smart switches 100, the gateway 200, and the registration controller 300 via the power line 2 mentioned in disclosure, include the UID of the device which sends the signals and the UID of the device which receives the signals. Furthermore, a secret code is used to encode the signals transmitted between the smart switches 100, the gateway 200, and the registration controller 300 via the power line 2, and the secret code is stored in smart switches 100, the gateway 200 and the registration controller 300.

In an embodiment, the registration controller 300 has the same appearance and function as the smart switch 100, the difference between the registration controller 300 and the smart switch 100 is that the registration controller 300 further includes a trigger button 32 and an IR sender 33. The registration controller 300 not only serves to control the smart switches 100 to automatically register on the gateway 200, but also acts as a smart switch.

Figure 3:
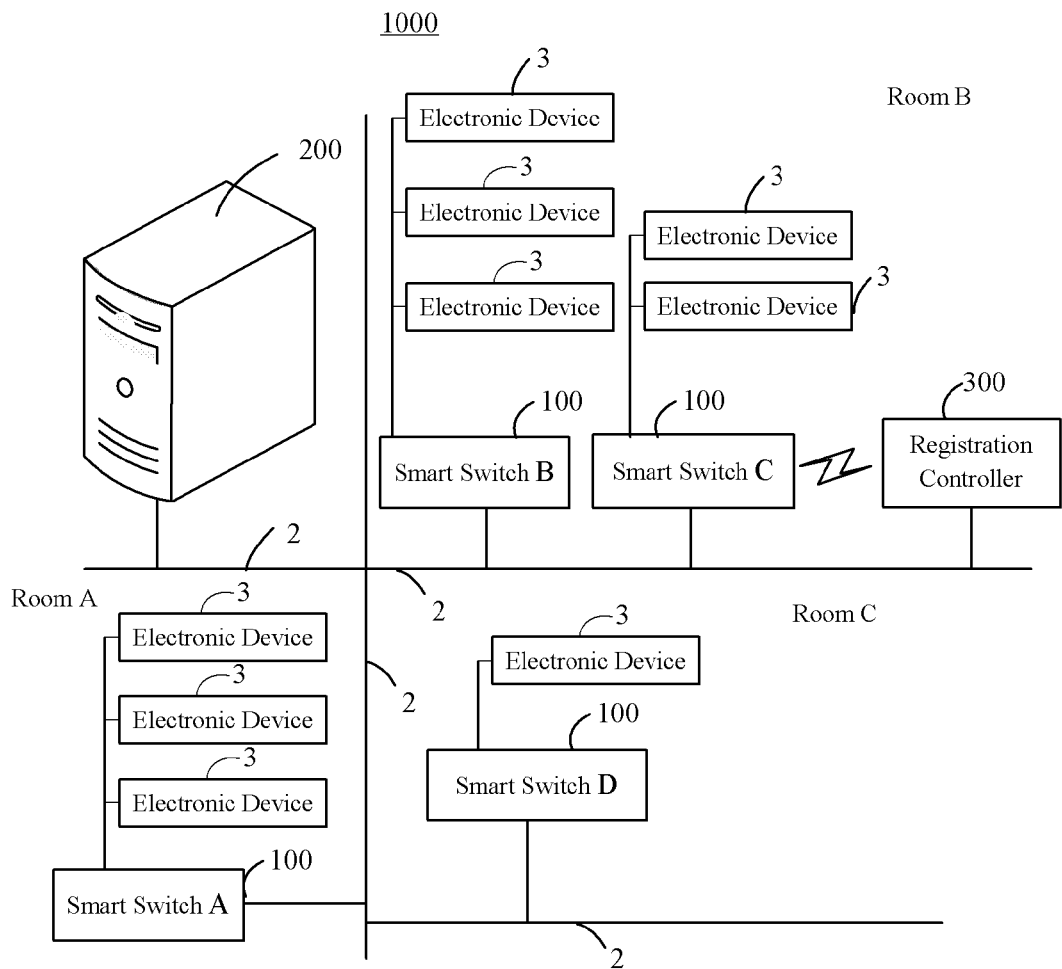
FIG. 3 is a schematic view showing a smart remote control system, according to a second exemplary embodiment.

Referring to FIG. 3, in a second embodiment, only one registration controller 300 is employed in the smart remote control system 1000.

The registration controller 300 is connected to the gateway 200, before the smart switches 100 register on the gateway 200, and the connection process is the same as mentioned in the first embodiment.

If user wants to register the smart switches 100 on the gateway 200, user should locate the connected registration controller 300 in the room which has the smart switches 100 needing to be registered, and run a registering program on the smart gateway 200.

For example, the registration controller 300 shown in FIG. 3 is located in the room B, the smart switches B and C 100 are also located in the room B. The trigger button 32 generates a trigger signal in response to user pressing it, and sends the trigger signal to the processor 35. The processor 35 controls the registration controller 300 to send a registration request to the gateway 200. In this embodiment, the registration controller 300 sends the registration request to the gateway 200 via the power line 2 in response to the trigger signal. The gateway 200 generates a serial code and sends the serial code to the registration controller 300 in response to the registration request. In this embodiment, the gateway 200 sends the serial code to the registration controller 300 via the power line 2. The serial codes generated by the gateway 200 in responding to the registration request are different each time, in this embodiment, the serial codes are generated according to the time of the received registration request. For example, when the gateway 200 receives the registration request a first time, the gateway 200 generates a first serial code, such as 01; when the gateway 200 receives the registration request for the second time, the gateway 200 generates a second serial code, such as 02.

The processor 35 of the registration controller 300 controls the IR sender 33 to send an IR signal in response to the received serial code, the IR signal includes the serial code, the UID of the registration controller 300, the UID of the gateway 200, and the secret code sent by the gateway 200. The smart switches B and C 100 receive the IR signal. The smart switches B and C store the serial code, the UID of the registration controller 300, and the secret code contained in the IR signal, into the first storage 10.

The gateway 200 further broadcasts signal to all of the smart switches 100 connected on the power line 2, for determining whether the smart switch 100 has received the IR signal sent by the registration controller 300. The smart switches 100 which receive the IR signal send an encoded registration code to the gateway 200 via the power line 2, in response to the broadcast signal. In this embodiment, the smart switches 100 are registered on the gateway 200 in a driven registration manner.

In this embodiment, the smart switches B and C 100 which are arranged in the room B send the encoded registration code to the gateway 200 in response to the broadcast signal. The registration code includes the serial code, the UID of the smart switch 100, and the UID of the registration controller 300 stored in the first storage 10. If the smart switch 100 includes more than one socket, the registration code further includes the UID of each socket.

The gateway 200 decodes the registration code and determines whether the UID of the registration controller 300 contained in the registration code matches the UID of the registration controller 300 contained in the registration request; if yes, the gateway 200 stores the UID of the registration code. In this way, the smart switch 100 is registered on the gateway 200, the gateway 200 can send control signals including the UID of the target smart switch 100, and the smart switch 100 determines whether the UID of the received control signal matches with its own UID. Only the matching smart switch 100 can parse the control signals, thus creating a point-to-point communication between the gateway 200 and the smart switch 100.

Also, the smart switches 100 can be registered on the gateway 200 in a forward registration manner. In the forward registration manner, the smart switch 100 which receives the IR signal sends an encoded registration code to the gateway 200 directly, and the other registration processes in the forward registration manner are the same as those of the driven registration manner, they are not repeated here.

The first embodiment and the second embodiment illustrate the connecting registration process of the registration controller 300 in connecting to the gateway 200 and the registration process of the smart switches 100 in registering on the gateway 200. After registering the smart switches 100 on the gateway 200, the gateway 200 is capable of sending a controlling signal to the smart switches 100, to control the electronic devices 3 connected to the smart switch 100.

Referring to FIG. 2, in the first embodiment, the remote controller 500 sends a remote command to the gateway 200 in response to user input, the gateway 200 further transmits the remote command to the smart switch 100, the smart switch 100 controls the electronic device 3 to execute an operation according to the remote command. In another embodiment, the remote controller 500 sends the remote command to the server 400 in response to user input, the server 400 transmits the remote command to the gateway 200, and the gateway 200 further sends the remote command to the smart switch 100.

The remote controller 500 can be a smart phone, tablet PC, notebook or other portable electronic device. The UIDs of the electronic devices 3, names of the electronic devices 3, and one-to-one relationship between the UIDs and the names of the electronic devices 3 are stored in the smart switch 100 and the remote controller 500. In another embodiment, the gateway 200 or the server 400 may store the last-mentioned data or information.

The remote controller 500 includes a third storage 410, an input unit 420, a second display unit 430, a communication unit 440 and a processor 450. The third storage 410, the input unit 420, the second display unit 430 and the communication unit 440 are connected to the processor 450. The UIDs of the electronic devices 3, names of the electronic devices 3, and one-to-one relationship between the UIDs and the names of the electronic devices 3 are stored in the third storage 410. The input unit 420 generates an input signal in response to user input. The processor 450 generates a remote command according to the input signal, and controls the second display unit 430 to display the content of the remote command. In this embodiment, the input unit 420 is a touch panel, a touch screen, a keyboard, or a voice input device, such as a microphone.

In detail, the input unit 420 receives user's input or user's selection of an operation command and a name of the electronic device 3 which is to execute the operation command, and generates the input signal according to the operation command and the name of the electronic device 3. The input signal includes the information of the operation command and the name of the electronic device 3 which is to execute the operation command The processor 450 obtains the UID of the target electronic device 3 according to input signal and the one-to-one relationship between the UIDs and the names of the electronic devices 3, and generates the remote command. The remote command generated by the processor 450 includes the operation command The processor 450 further controls the communication unit 440 to send the remote command and the UID of the target electronic device 3 to the gateway 200.

Because all of the smart switches 100 and the electronic devices 3 connected to the smart switch 100 are registered on the gateway 200, the gateway determines the UID of the smart switch 100 to which the target electronic device 3 is connected according to the UID of the target electronic device 3. The gateway 200 transmits the remote command including the UID of the target electronic device 3 to the smart switch 100 via PLC or OPLC.

In another embodiment, the processor 450 controls the communication unit 440 to send the remote command and the UID of the electronic device 3 to the server 400. The server 400 transmits the remote command and the UID of the electronic device 3 to the gateway 200.

The smart switch 100 also can be a button switch or a rocker switch. The smart switch 100 includes a first display unit 80 configured to display instantaneous information concerning the electronic devices 3 which are downstream of the smart switch 100. The first display unit 80 can be an LCD, an electronic paper display, an LED display, a touch display, or the like. The smart switch 100 further includes at least one socket 70 configured to be connected to the plug of the electronic device 3. The socket 70 can be a three-phase or two-phase socket. In an embodiment, the smart switch 100 includes one or more indicator lights, each of the indicator lights is related to one socket 70 of the smart switch 100 and each indicator light is configured to indicate the power state of the electronic device 3 connected to the related socket 70. The electronic devices 3 can be fridges, air-conditioners, computers, fans, TVs, lamps, microwave ovens, and the like.

The smart switch 100 further includes a first storage 10, a PLC modem unit 20, a processor unit 40 and a remote unit 50. The first storage 10, the screen 20 and the power detecting unit 30 are connected to the processor unit 40. The UIDs of the electronic devices 3, the names of the electronic devices 3, and a one-to-one relationship between the UIDs and the names of the electronic devices 3 are stored in the first storage 10. The PLC modem unit 20 receives the remote command including the UID of the target electronic device 3 sent by the gateway 200 from the power line 2. The processor unit 40 includes a converting module 41 and a control module 42, the converting module 41 converts the remote command to a control signal that can be recognized by the target electronic device 3, the control module 42 controls the remote unit 50 to send the control signal to the target electronic device 3, thus controlling the target electronic device 3 to execute the operation. In this embodiment, the remote unit 50 is an infrared device. In other embodiments, the remote unit 50 transmits remote signals via BLUETOOTH, Z-WAVE, NFC, ZIGBEE, WIFI, or other communication technologies.

In an embodiment, the smart switch further includes a wireless communication unit 60 configured to establish communication between the gateway 200 and the electronic devices 3. In this embodiment, the gateway 200 also sends the remote command the UID of the target electronic device 3 to the smart switch 100 wirelessly, the smart switch 100 receives the remote command including the UID of the target electronic device 3 via the wireless communication unit 60.

In this embodiment, the remote command can be a turn on/off command, a log off, a shutdown, a restart command, or the like.

Figure 4:
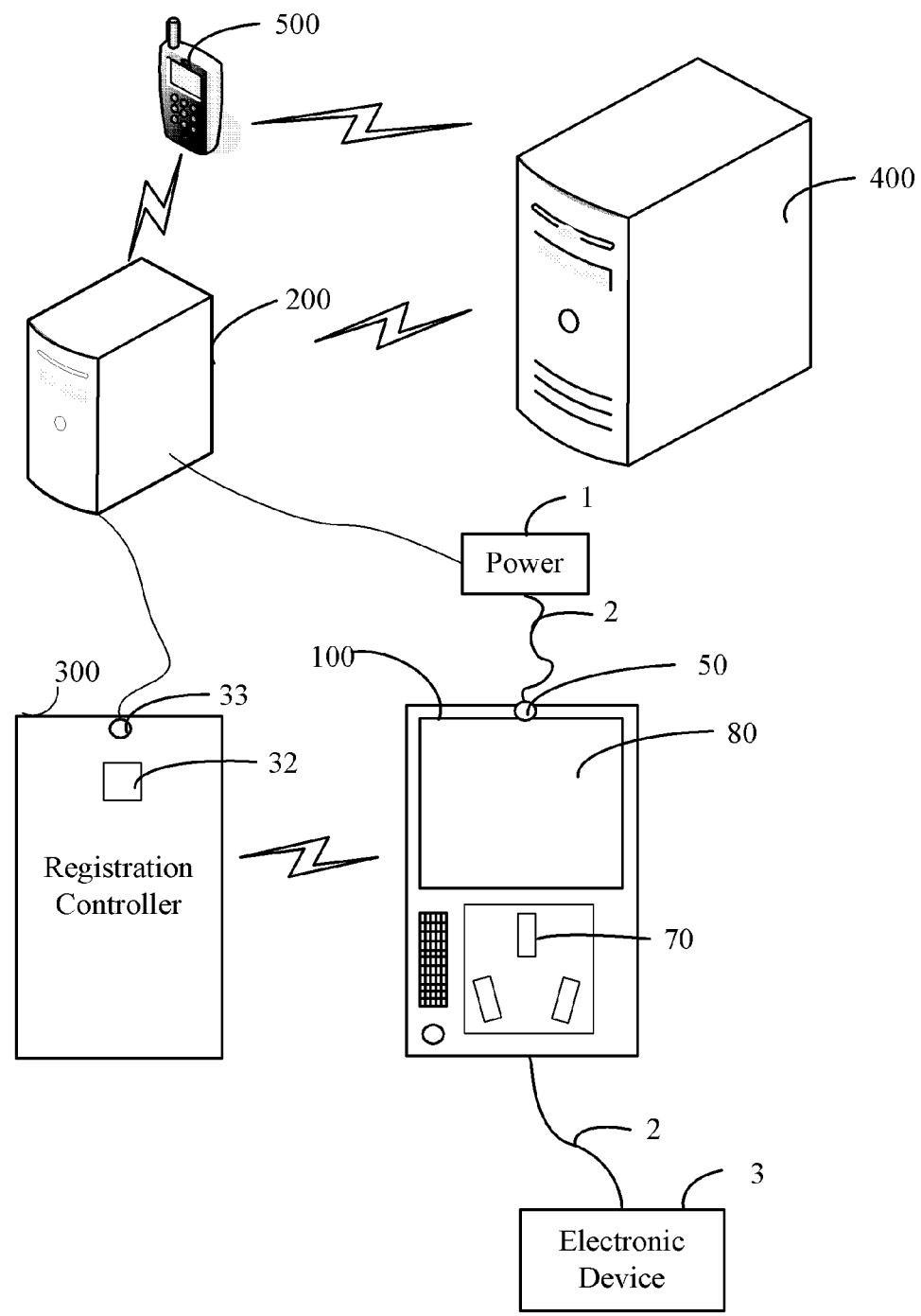
FIG. 4 is a schematic view showing a smart remote control system using the smart switch, according to a third exemplary embodiment.

Referring to FIG. 4, the smart switch 100 is connected to at least one electronic device 3 and a power 1. The smart switch 100 is capable of automatically detecting power state of the connected electronic devices 3, and displaying to users electricity consumption and energy charge of the connected electronic devices 3. The smart switch 100 can be a switch including a display, or including a display and one or more sockets.

In an embodiment, the smart switch 100 further includes a plug 95 configured to connect the smart switch 100 to the power supply, thus connecting the electronic devices 3 to a power source.

When two or more electronic devices 3 are connected on the smart switch 100 via the sockets 70, the control module 42 controls the remote unit 50 to send the control signal to the correct electronic device 3 by reference to the different UIDs of the electronic devices 3.

The smart switch 100 can remotely control the electronic devices 3 applied in the smart remote control system 1000 in response to user input on the remote controller 500.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A remote control system comprising:
   at least one smart switch, the smart switch connecting to a power source and at least one electronic device, the smart switch comprising:
      a storage configured to store a unique identification code of the electronic device;
      a Power Line Communication (PLC) or Optical Fiber Power Line Communication (OPLC) modem unit;
      a remote unit; and
      a processor unit comprising a converting module and a control module;
      wherein the converting module converts a remote command to a control signal that can be recognized by the electronic device, and the control module controls the remote unit to send the control signal to the electronic device;
   a gateway communicating with the smart switch via the PLC or the OPLC modem unit, configured for sending the remote command and the unique identification code of the electronic device to the PLC or OPLC modem unit; and
   a registration controller communicating with the gateway, wherein after a mating process between the registration controller and the gateway is finished, the registration controller sending an identification code of the smart switch to the gateway, for registering the smart switch to the gateway.

2. The remote control system as described in claim 1, further comprising a remote controller communicated to the gateway, wherein the remote controller comprises:
   a storage configured to store the unique identification code of the electronic device, a name of the electronic device, and one-to-one relationship between the unique identification code and the name of the electronic device,
   an input unit configured to generate an input signal in response of user's input; and
   a processor configured to generate a corresponding remote command according to the input signal and control the remote controller to send the remote command and the unique identification code of the electronic device to the gateway.

3. The remote control system as described in claim 2, wherein the input signal comprises information of an operation command and the name of the electronic device which executes the operation command, input or selected by a user; and the processor of the remote controller obtains the unique identification code of the electronic device according to the input signal and the one-to-one relationship between the unique identification code and the name of the electronic device.

4. The remote control system as described in claim 1, wherein the smart switch further comprises a socket configured to connect a plug of the electronic device, and the socket is a three-phase socket or a two-phase socket.

5. The remote control system as described in claim 1, wherein the remote unit of the smart switch is an Infrared device.

6. The remote control system as described in claim 1, wherein the gateway sends an identification code of the gateway and a secret code to the registration controller when the registration controller is located within the communicating range of the gateway and a mating program is run on the gateway, the registration controller further sends an identification code of the registration controller to the gateway to save the identification code of the registration controller in the gateway to finish the mating process.

7. The remote control system as described in claim 6, wherein the secret code is the identification code of the gateway or input by a user.

8. The remote control system as described in claim 6, wherein the registration controller comprises:
   a second Infrared receiver configured to receive the identification code of the gateway and the secret code sent by the gateway;
   a trigger button configured to generate a trigger signal in response of a user pressing the trigger button;
   an Infrared sender; and
   a processor configured to control the Infrared sender to send an Infrared signal comprising the identification code of the registration controller and the secret code in response to the trigger signal, and control the registration controller to send a registering request to the gateway in response to the trigger signal;
   the smart switch further comprises a first Infrared receiver configured to receive the Infrared signal, the smart switch further sends a registration code encoded by the secret code to the gateway, the registration code comprises the identification code of the smart switch and the identification code of the registration controller;
   the gateway decodes the registration code and saves the identification code of the registration controller.

9. The remote control system as described in claim 8, wherein the gateway sends a broadcasting signal to the smart switch in response of the registration request, the smart switch which has received the Infrared signal sends the registration code to the gateway in response of the broadcasting signal.

10. The remote control system as described in claim 9, wherein the smart switch comprises a socket, and the registration code further comprises an identification code of the socket.

* * * * *